United States Patent
Beyer et al.

(10) Patent No.: US 6,247,893 B1
(45) Date of Patent: Jun. 19, 2001

(54) HYDRAULIC TURBINE FOR ENHANCING THE LEVEL OF DISSOLVED GAS IN WATER

(75) Inventors: James R. Beyer, York; Richard K. Fisher, Jr., Jacobus; Robert G. Grubb, York, all of PA (US)

(73) Assignee: Voith Siemens Hydro Power Generation, Inc., York, PA (US)

(*) Notice: Subject to any disclaimer, the term of this patent is extended or adjusted under 35 U.S.C. 154(b) by 0 days.

(21) Appl. No.: 09/631,056

(22) Filed: Aug. 1, 2000

Related U.S. Application Data (62) Division of application No. 09/312,539, filed on May 14, 1999, now Pat. No. 6,095,749, which is a division of application No. 08/733,366, filed on Oct. 17, 1996, now Pat. No. 5,924,842.

(51) Int. Cl.$^7$ ..................................... F04D 29/38
(52) U.S. Cl. ........................... 415/115; 415/116
(58) Field of Search ................... 415/115, 116; 261/93

(56) References Cited

U.S. PATENT DOCUMENTS

| | | |
|---|---|---|
| 1,579,355 | 4/1926 | Greenawalt . |
| 1,925,777 | 9/1933 | Sperling . |
| 1,942,995 | 1/1934 | Biggs . |
| 2,668,079 | 2/1954 | Menegus et al. . |
| 2,772,863 | 12/1956 | Harney et al. . |
| 2,803,428 | 8/1957 | Garnett . |
| 2,914,301 | 11/1959 | Hess . |
| 3,108,146 | 10/1963 | Gross . |
| 3,123,651 | 3/1964 | Gross et al. . |
| 3,132,839 | 5/1964 | Haekal . |
| 3,305,215 | 2/1967 | Swiecicki et al. . |
| 3,862,747 | 1/1975 | Richter . |
| 4,169,047 | 9/1979 | Wilson . |
| 4,188,287 | 2/1980 | Faulkner et al. . |
| 4,371,480 | 2/1983 | Vos . |
| 4,479,757 | 10/1984 | Holmes et al. . |
| 4,780,051 | 10/1988 | Fisher, Jr. . |
| 6,095,749 | * 8/2000 | Beyer et al. .......................... 415/115 |

FOREIGN PATENT DOCUMENTS 2071402 9/1971 (FR) .

* cited by examiner

*Primary Examiner*—John Kwon
(74) *Attorney, Agent, or Firm*—Foley & Lardner (57) ABSTRACT

A turbine, adaptable to enhance the levels of dissolved gas such as oxygen in water flowing therethrough, includes a rotating shaft and a runner secured to the shaft. The runner includes a crown, a band and a plurality of runner blades. Each blade is defined by an inner edge and a distal outer edge, a leading edge and a trailing edge separated by a water directing surface. At least one blade includes an integrally formed gas passage in fluid communication with a gas admission aperture in the crown. The gas passage may extend to the trailing edge. Alternatively, the gas passage may extend to the band, and the band then includes a gas discharge means. A method for making a blade having an integral gas passage includes securing a member with a first groove to an insert with a cooperating second grove. A turbine having a hub and a plurality of rotatable blades includes a plurality of groups of gas passages extending to at least one exterior region of the hub associated with a blade. The blade includes a gas admission passage extending to an edge region of the blade. A flexible boot is provided on the blade to fluidly couple the blade with at least one selected gas passage depending on the pitch of the blade. A control system may monitor sensors and regulate the dissolved oxygen level in the water.

20 Claims, 13 Drawing Sheets

HYDRAULIC TURBINE FOR ENHANCING THE LEVEL OF DISSOLVED GAS IN WATER

CROSS-REFERENCE TO RELATED APPLICATIONS

This application is a divisional of U.S. patent application Ser. No. 09/312,539, filed May 14, 1999, now U.S. Pat. No. 6,095,749, which in turn is a divisional of U.S. patent application Ser. No. 08/733,366, filed Oct. 17, 1996, now U.S. Pat. No. 5,924,842.

FIELD OF THE INVENTION

The present invention relates generally to hydroelectric turbine installations. More particularly, this invention pertains to hydroelectric installations with means for enhancing the level of dissolved gas in water passing through the turbine.

BACKGROUND OF THE INVENTION

A significant environmental problem for many hydroelectric facilities is the water quality of turbine discharges. The primary water quality problem is often low dissolved oxygen (DO) levels which occur seasonally. During the summer months, thermal stratification of the reservoir produces a surface layer of less dense, warm water with relatively high dissolved oxygen and a lower, relatively cold oxygen-depleted layer resulting from the decay of organic material on the reservoir bottom. Hydraulic turbines draw their discharges from the lower level which can create water quality problems downstream of the facility.

Relicensing and rehabilitation of a hydroelectric facility offer an opportunity to address environmental and industrial development concerns over dissolved oxygen levels and other water quality regulations which affect hydropower releases. Rehabilitating an existing hydroelectric facility may include replacement of the runner. Replacing an existing runner with a new runner having integral passages, and providing air through existing structures or new structures of the installation to the integral passages, enhances dissolved oxygen levels in the water without material losses in efficiency or substantial increases in cost of rehabilitation.

Various attempts have been made to enhance the level of dissolved oxygen in water downstream of hydroelectric installations. For example, U.S. Pat. No. 4,789,051 to Fisher, Jr. discloses an apparatus comprising a manifold which contains a bounded air channel extending the length of the runner blade trailing edge. A plurality of holes are formed along the manifold extending between the channel and the turbine interior, the channel being in fluid communication with a source of oxygen. For the manifold to remain securely fastened over extended periods of operation, the trailing edge of the runner blade must be relatively thick, which may result in efficiency losses. Additionally, many installations have existing structures which make it impractical and thereby costly to provide air directly to the trailing edge of the runner blade.

Runner blade construction consists of either a solid casting or a fabrication. Most Francis runner blades built in the 70's and 80's were solid cast with extra material added in critical areas for final finishing. These castings were, and often still are, hand ground to templates and fixtures to meet the desired shapes. As machine tools have improved and the runner blade designs have become more computerized, critical areas and features of more complex geometries, such as integral passages, can nowadays be machined into the cast blades. However, this more modern machining approach has done little to improve the manufacturing cycle time, due to the long lead time associated with cast components, nor has it materially reduced manufacturing costs. Although fabricated blades offer improved cycle time and cost advantages, it has proven difficult in practice to fabricate blades having complex geometric features such as integral gas channels, particularly in the thinner portions of the blade.

The foregoing therefore indicates that prior art methods of feeding air directly to the trailing edge of the runner blade have not proved fully satisfactory in practice. Additionally, there is a need for a method of forming a runner blade having a gas channel of relatively complex geometry which offers improved cycle time and is less expensive than the prior art methods.

SUMMARY OF THE INVENTION

The present invention enhances the level of dissolved gas in water flowing through a Francis turbine comprising a crown, a band, and a plurality of blades extending between the crown and the band. At least one of the blades includes a leading blade portion and a rear edge in which a first slot extends along at least a portion of the rear edge. The blade also includes a trailing blade portion having a front edge in which a second slot extends along at least a portion thereof. The trailing blade portion is secured to the leading blade portion along the front edge and the rear edge, respectively, so that the first and second slots cooperate to form an integral passage in the blade. The turbine includes a means for discharging an oxygen containing gas from the integral passage.

The present invention also includes a method of making a reaction turbine blade for enhancing the level of dissolved gas in water passing through the turbine. The method comprises the steps of forming a first slot along the rear edge of the leading blade portion, forming a second slot along the front edge of the trailing blade portion, and forming a plurality of discharge passages in the trailing blade portion extending from the second slot to the trailing edge. The blade portions are secured together by joining the rear edge of the leading blade portion to the front edge of the trailing blade portion to form a substantially planar blade including a conduit formed by the first groove cooperating with the second groove. The planar blade is then press-formed to the shape of a hydrofoil.

The present invention further includes a method of making a reaction turbine blade having an integral gas passage, the method comprising machining a blank to have a blade profile and control points, securing a thin plate to a region of the blank to form a channel, pressing the blade to the shape of a hydrofoil, and removing the control points.

According to a further aspect of the present invention, the runner for a Francis turbine includes a means for discharging an oxygen containing gas from the band.

According to another aspect of the invention, a hydraulic turbine installation includes a control system for controlling an oxygen discharging means and thereby the level of dissolved oxygen in the water.

According to another aspect of the invention, a Kaplan turbine is used for enhancing the level of dissolved gas in water. The turbine comprises a hub and a plurality of blades pivotally connected to the hub so that the angular position of each blade relative to the hub (i.e., the pitch of each blade) is adjustable. The inner edge of each blade generally sweeps an exterior surface region of the hub during variations in pitch of the blades. At least one of the blades has a gas admission passage extending from the inner edge of the blade to a spaced apart region thereof. The hub comprises a plurality of groups of gas passages extending from a gas source to the exterior surface region. A flexible boot is secured to the blade and is effectively in contact with the exterior surface region associated therewith to form an interconnecting gas passage between at least one selected gas passage of the group of gas passages and the gas admission passage of the blade.

According to yet another aspect of the invention, the level of dissolved gas in water flowing through a turbine having a shaft and a runner secured to the shaft is enhanced by means of a runner including a hollow hub and a plurality of generally radially extending blades. The shaft has an opening extending therethrough to the hollow hub. The method involves forming in the runner at least one passage extending from the interior of the hub to an edge region of a respective one of the blades. The runner is installed in the water passageway and a chamber is formed in an upper interior region of the hollow hub to fluidly couple the opening in the shaft with the at least one passage in the runner. An oxygen containing gas is supplied to the opening in the shaft during operation of the turbine.

According to a further aspect of the invention, the level of dissolved gas in water flowing through a hydraulic turbine is enhanced by providing an inflatable shroud having an adjacent gas discharge opening. The shroud creates a lower pressure region, thereby facilitating the discharge of the gas from the opening.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF A PREFERRED EXEMPLARY EMBODIMENT

The present invention relates generally to hydroelectric installations having turbines provided with features designed to enhance the level of dissolved gas, such as oxygen, in water flowing through the turbines.

Figure 1:
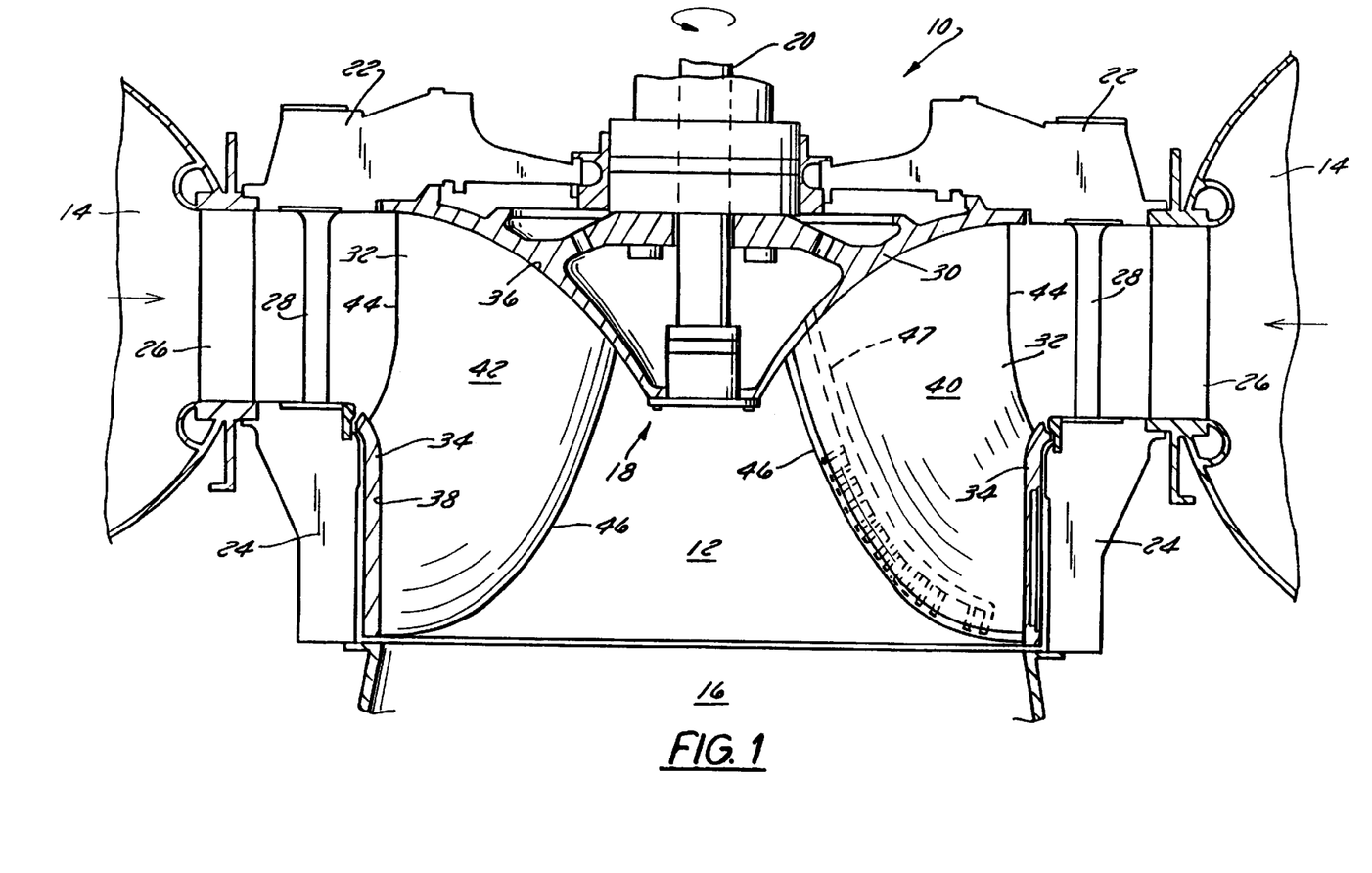
FIG. 1 is an elevational view, partially in cross section, of a Francis turbine including a first embodiment of a runner of the present invention.

Referring to FIG. 1, a portion of a hydroelectric turbine installation generally designated as 10 comprises a passageway 12, in which water flows from a source 14 in fluid communication with the upstream end of installation 10, to a lower elevation discharge region 16. As illustrated, installation 10 is a Francis turbine having a runner 18 secured to a shaft 20 supported for rotation therewith, a stationary head cover 22, a bottom discharge ring 24, and a plurality of stationary stay vanes 26. Installation 10 also includes a plurality of pivotally adjustable wicket gates 28 to regulate the flow of water impinging on turbine runner 18.

Turbine runner 18 includes a crown 30 secured to the lower end of shaft 20 and a plurality of circumferentially spaced runner blades 32 extending from crown 30 and terminating at an enclosing band 34 substantially concentric with crown 30. Each blade 32 is fixedly secured to crown 30 along an inner edge 36 of blade 32, and to band 34 along a distal outer edge 38. Each blade 32 has a water directing surface defined by a pressure side 40, an oppositely facing suction side 42, a leading edge 44 and a spaced apart trailing edge 46. At least one blade 32 includes an integrally formed gas passage 47 extending from inner edge 36 to trailing edge 46.

Figure 4:
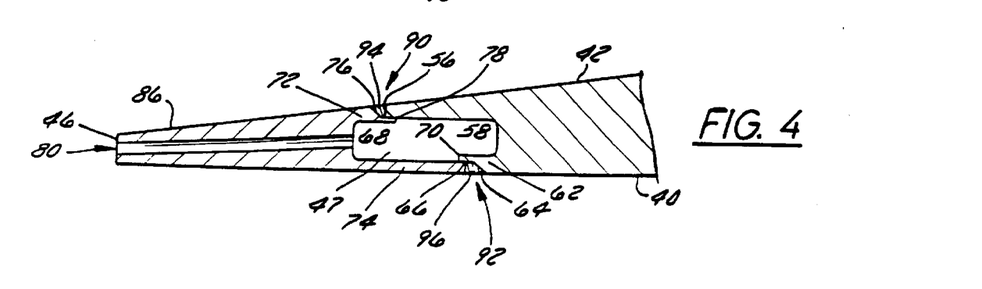
FIG. 4 is a cross-sectional view of a portion of the blade of FIG. 2 taken along line 4—4 shown in FIG. 2.
Figure 5:
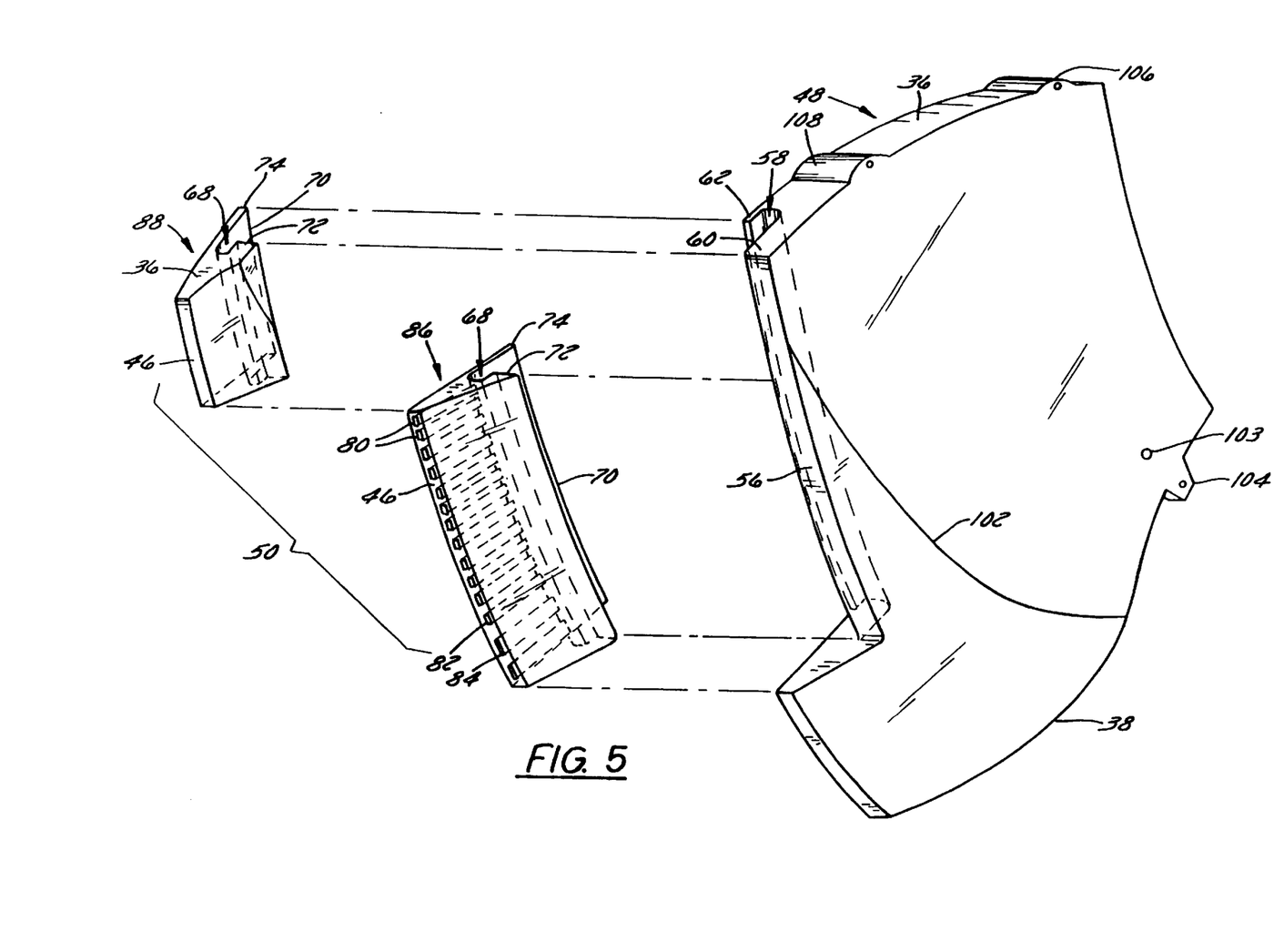
FIG. 5 is an exploded perspective view of the blade of FIG. 2.
Figure 7:
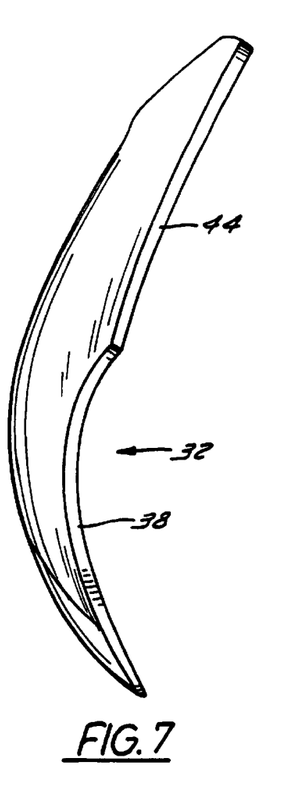
FIG. 7 is a right side view of the blade shown in FIG. 6.
Figure 8:
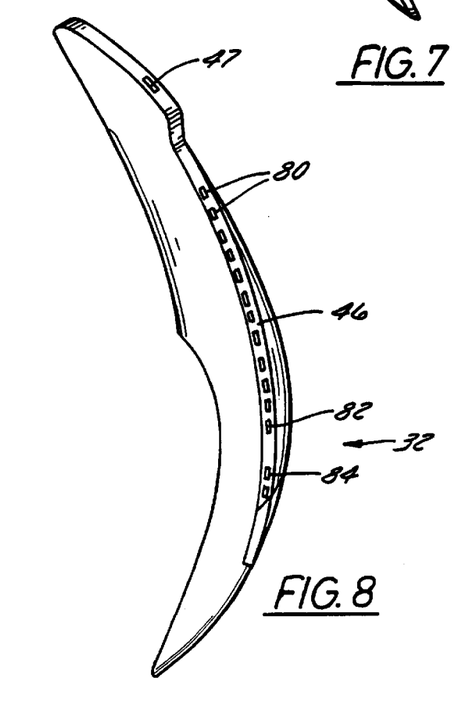
FIG. 8 is a left side view of the blade shown in FIG. 6.
Figure 9:
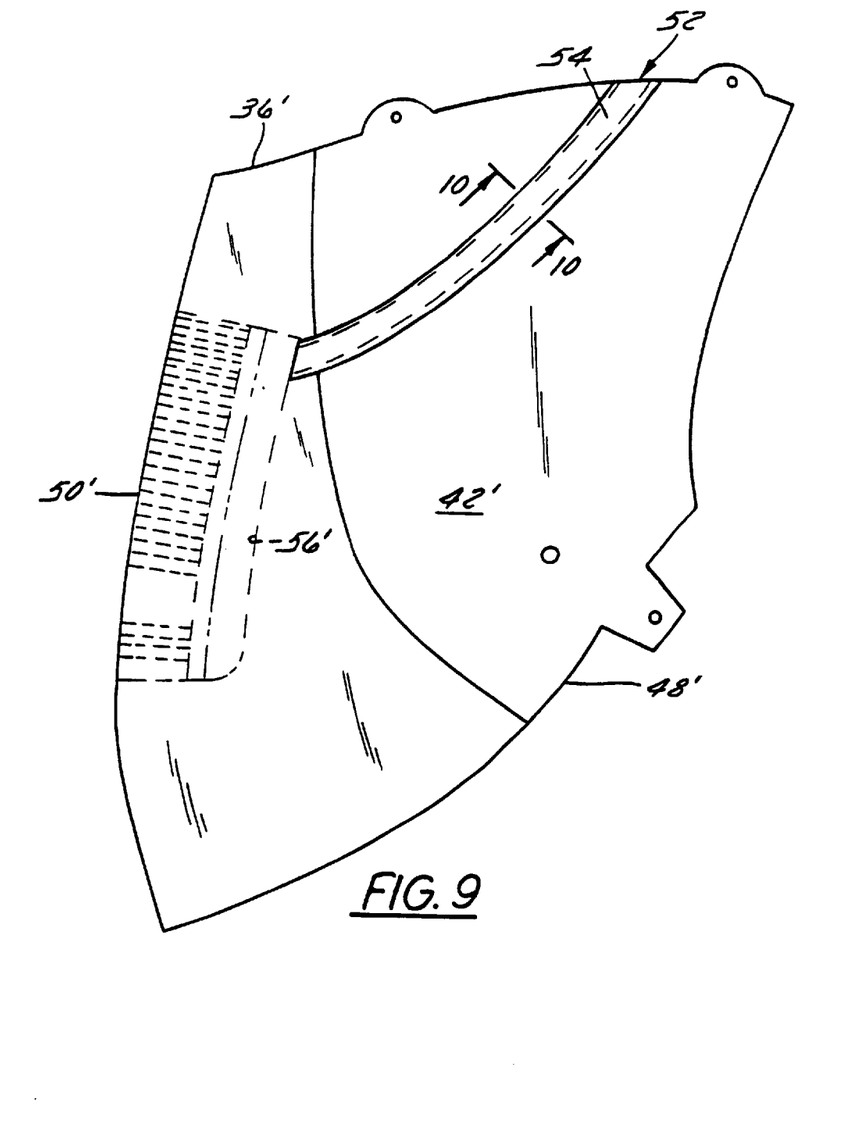
FIG. 9 is a top plan view of an alternative embodiment of the blade for the runner of FIG. 1, the blade being shown in a partially manufactured condition.
Figure 10:
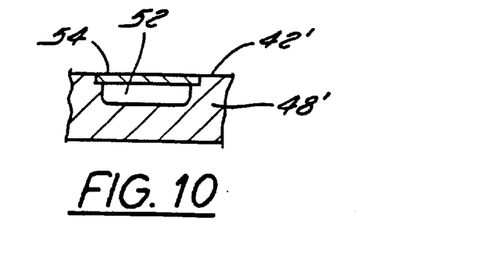
FIG. 10 is a cross-sectional view of a gas passage in the blade of FIG. 9 taken along line 10—10 shown in FIG. 9.

Turning now to FIGS. 2–8, the method of forming blade 32 (see FIGS. 6–8) associated with runner 18 will be described. Initially, a blank is cut from mill plate to the overall blade profile by a suitable method (e.g., by plasma arc). Mill plate preferably comprises stainless steel plate such as ASTM A240 Type 304L or ASTM A240 Type S41500. As best shown in FIG. 5, the blank is cut into a leading blade portion or member 48 and a trailing blade portion or insert 50. Insert 50 preferably includes a region of inner edge 36 of blade 32. However, an alternative embodiment is illustrated in FIGS. 9 and 10 in which an insert 50' is spaced from an inner edge 36', and a shallow groove 52 and an overlying cover plate 54 extend from inner edge 36' to a rear edge 56' of a member 48'. Cover plate 54 is welded within an upper area of shallow groove 52 and is generally flush with a suction side 42' of the blade.

Figures 2, 3:
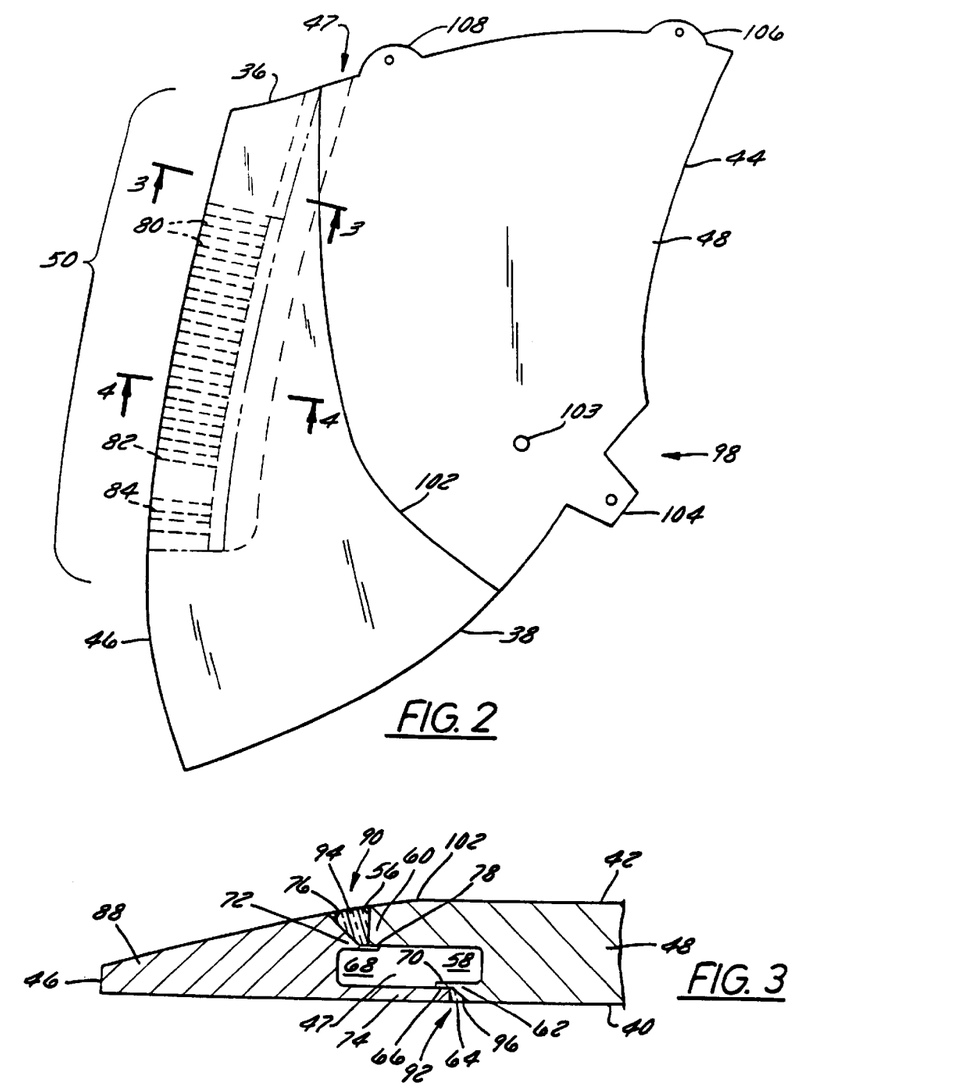
FIG. 2 is a top plan view of one associated blade from the runner of FIG. 1, the blade being shown in a partially manufactured condition.
FIG. 3 is a cross-sectional view of a portion of the blade of FIG. 2 taken along line 3—3 shown in FIG. 2.

Returning now to FIGS. 3–5, a rearwardly opening slot or groove 58 is machined along a length of a rear or trailing edge 56 of member 48, leaving an upper shoulder 60 and a lower shoulder 62. Lower shoulder 62 is machined to include a bevelled surface 64 extending from pressure side 40 (i.e., the lower surface as illustrated in FIGS. 3 and 4) to a rearwardly projecting lip 66. A frontwardly opening slot or groove 68 is machined along a front or leading edge 70 of insert 50, leaving an upper shoulder 72 and a lower shoulder 74. Upper shoulder 72 is machined to include a bevelled surface 76 extending from suction side 42 (i.e., the upper surface as illustrated in FIGS. 3 and 4) to a frontwardly projecting lip 78.

A plurality of discharge passages 80 are formed in insert 50 (e.g., by drilling) extending from groove 68 to trailing edge 46. Discharge passages 80 are generally provided at regularly spaced intervals, however, an extra wide interval may be provided between adjacent passages (such as between passages 82 and 84) to reinforce an area of insert 50 subject to particular pressure during the pressing operation described below. Discharge passages 80 may be provided with any desired cross-sectional shape such as by use of an Electrostatic Discharge Machine (EDM). As shown in FIG. 5, insert 50 may be divided into segments 86 and 88 so that segment 86 having discharge passages 80 is small enough to fit into the equipment used to form passages 80. In the illustrated embodiment, a total of fourteen rectangular slots 80 have been provided.

Insert 50 and member 48 are then preferably aligned in a clamping fixture (not shown). More specifically, insert 50 is aligned with member 48 such that lip 78 of insert 50 projects a short distance forwardly into groove 58 and abuts against upper shoulder 60 (see FIGS. 3 and 4). Similarly, lip 66 of member 48 projects a short distance rearwardly into groove 68 and abuts against lower shoulder 74. Thus, bevelled surface 76 and rear edge 56 form a generally V-shaped, upwardly opening channel 90, and bevelled surface 64 and front edge 70 form a generally V-shaped, downwardly opening channel 92. Upwardly opening channel 90 and downwardly opening channel 92 are then filled by weld build-up to form a suction side weld-joint 94 and a pressure side weld-joint 96, respectively, which fixedly secure member 48 and insert 50 together to form a flat plate weldment 98 (see FIG. 2). Suction side weld-joint 94 is preferably offset from pressure side weld-joint 96, thereby facilitating the forming of grooves 58 and 68 along the pressure and suction sides 40 and 42, respectively, rather than confining grooves 58 and 68 solely to the relatively narrow edges 56 and 70, respectively. In addition to providing this manufacturing advantage, the offset weld-joints are believed to increase the durability of such a structure over those having adjacent weld-joints. As shown in FIGS. 3 and 4, rearwardly opening groove 58 and frontwardly opening groove 68 thus cooperate to form an integral aeration conduit or passage 47 through which an oxygen containing gas, such as air, can be transported.

Returning to FIG. 2, flat plate weldment 98 is then machined (e.g., by face milling on a CNC horizontal boring mill) to establish a thickness distribution from trailing edge 46 forward to a line of maximum thickness 102. Following this thinning operation, the machined area is ground to remove all ridges and prepared for forming. Flat plate weldment 98 is then preferably uniformly heated between 1850° F. and 1945° F. and pressed between male and female former halves in a hydraulic press (not shown) to the final shape of a hydrofoil having a water directing surface. Of course, the pressing operation could also be done without heating plate 98 depending on the composition, sizes and shapes of the materials being formed. During the pressing operation, close attention is taken to controlling blade position in the former to insure correct contour. An important part of the process is thus the establishment of control points 103 and 104 that are used to position the thinned blade for forming and for final machining. In the illustrated embodiment, control point 103 is a hole and control point 104 is a generally rectangular tab projecting outwardly from outer edge 38. The forming press (not shown) is, of course, provided with a complementary pin and slot arrangement to engage control points 103 and 104, respectively. While lifting tabs 106 and 108 are conveniently provided on blade 32 to assist the handling, they may also be used as control points. Accordingly, those skilled in the art will readily appreciate that a variety of combinations of control points 103, 104 may be used depending on the particular manufacturing constraints. Blade 32 is then cooled in the former under pressure to assure consistency and may subsequently be tempered to impart toughness and ductility, as required by the material of choice.

Figure 6:
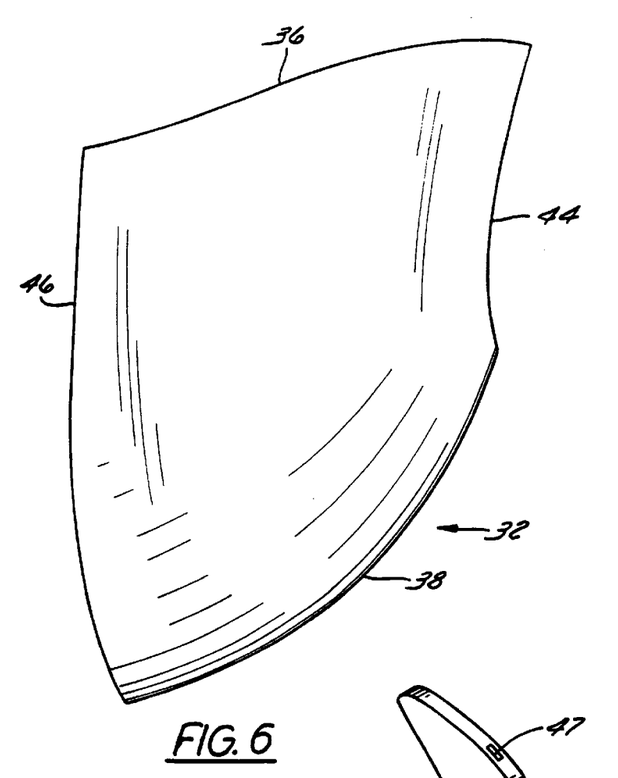
FIG. 6 is a top plan view of the blade of FIG. 2, the blade being shown in a finished manufactured condition.

Following the pressing operation, blade 32 is cleaned by sand blasting and the final shape is verified using a measuring device such as a laser tracker. Blade 32 is fixtured for machining using control points 103 and 104 established for forming. Leading edge 44 and trailing edge 46, along with inner edge 36 and outer edge 38, are then CNC machined to final shape and position. Afterward, control points 103 and 104 are removed by filling the hole and removing the tab, respectively, and blade 32 is ground to meet profile, finish and fairness requirements. FIGS. 6–8 illustrate blade 32 in a finished condition ready for assembly with crown 30 and band 34.

Turning now to FIGS. 11–15, a portion of another embodiment of a runner 200 for a Francis turbine is illustrated. Runner 200 includes a crown 202, a band 204 substantially concentric with crown 202, and a plurality of circumferentially spaced blades 206 extending between crown 202 and band 204. Each blade 206 is fixedly secured to crown 202 at an inner edge 208 and to band 204 at a distal outer edge 210. Each blade 206 has a water directing surface defined by a pressure side 212, an oppositely facing suction side 214, a leading edge 216 and a spaced apart trailing edge 218. At least one blade 206 further includes a gas admission passage 220 extending from a gas admission aperture 222 formed in crown 202 to a gas admission aperture 224 formed in band 204. Gas admission passage 220 comprises a shallow groove 226 integrally formed on suction side 214 of blade 206. Alternatively, the gas admission passage could be formed on the pressure side of blade 206 instead of on the suction side. A cover plate 228 is secured over shallow groove 226 to complete gas admission passage 220. Although not illustrated, cover plate 228 could also include a plurality of gas discharge apertures extending from gas admission passage 220 to suction side 214.

Figures 11, 15:
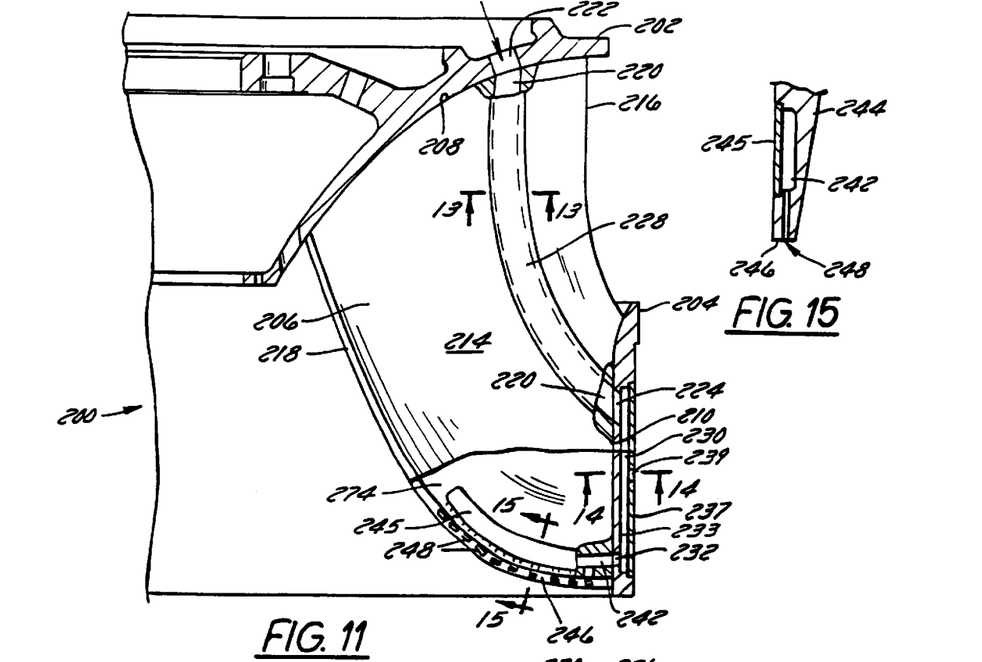
FIG. 11 is an elevation view, partially in cross section, of an alternative embodiment of a runner of the present invention showing a portion of the crown, the band and two adjacent blades.
FIG. 15 is an enlarged cross-sectional view of a gas admission passage in the other of the blades of FIG. 11 taken along line 15—15 shown in FIG. 11.
Figures 12, 13, 14:
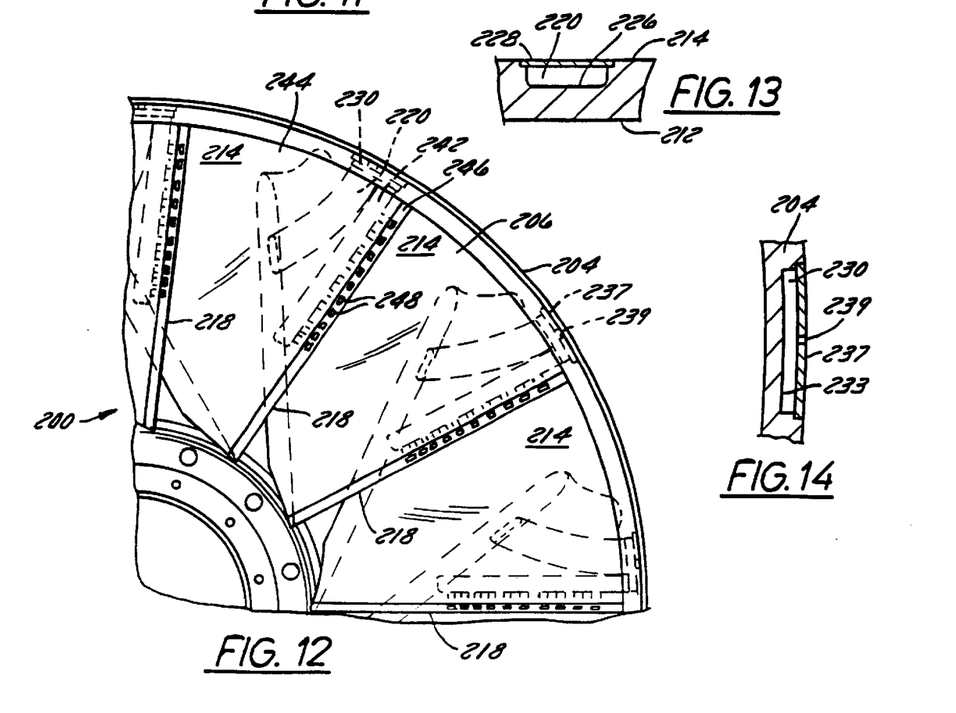
FIG. 12 is a bottom plan view of the runner of FIG. 11.
FIG. 13 is an enlarged cross-sectional view of a gas admission passage in one of the blades of FIG. 11 taken along line 13—13 shown in FIG. 11.
FIG. 14 is an enlarged cross-sectional view of an interconnecting passage in the band of FIG. 11 taken along line 14—14 shown in FIG. 11.

As illustrated in FIGS. 11 and 12, band 204 includes an interconnecting passage 230 leading from gas admission aperture 224 to a gas admission aperture 232 adjacent a bottom region of band 204. Interconnecting passage 230 comprises a shallow groove 233 in band 204 and a cover plate 237 secured over groove 233. Cover plate 237 may include a gas discharge aperture 239 extending therethrough (see FIG. 14) for permitting gas into the gap between band 204 and a surrounding discharge ring (not shown).

A gas admission passage 242 is formed in a blade 244 adjacent to blade 206 for discharging gas from interconnecting passage 230 in band 204. Gas admission passage 242 in blade 244 is covered by a plate 245 and extends from gas admission aperture 232 in band 204 along a trailing edge 246 of blade 244 toward crown 202. A plurality of discharge apertures 248 extend from gas admission passage 242 to trailing edge 246 for allowing discharge of the oxygen containing gas from band 204. Although not shown, an alternative to gas admission passage 242 and discharge apertures 248 is that a discharge opening could be provided in the lower region of band 204.

Figure 16:
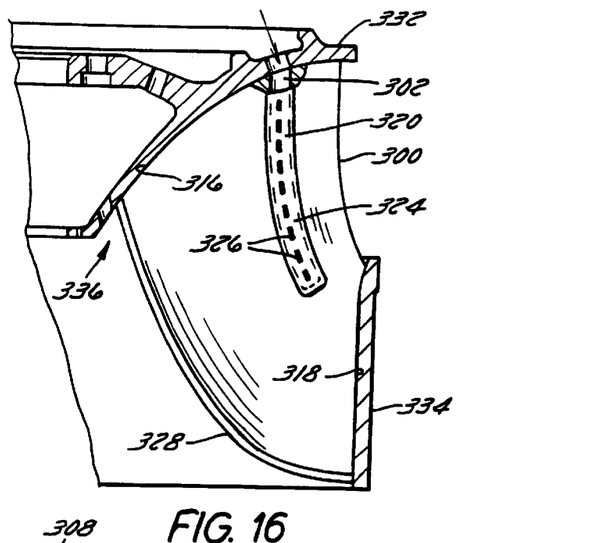
FIG. 16 is an elevation view, partially in cross section, of another alternative embodiment of a runner of the present invention showing a portion of the crown, the band and the blade.
Figure 17:
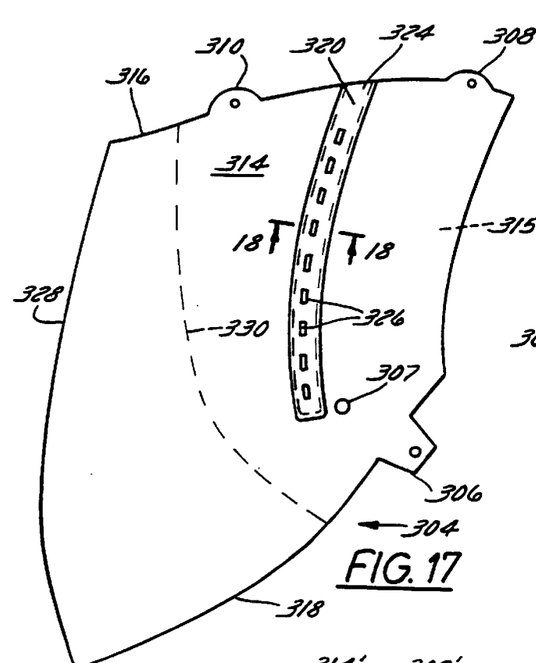
FIG. 17 is a top plan view of one associated blade from the runner of FIG. 16, the blade being shown in a partially manufactured condition.
Figure 18:
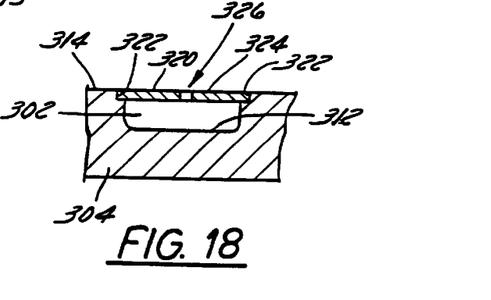
FIG. 18 is an enlarged cross-sectional view of a gas passage in the blade of FIG. 17 taken along line 18—18 shown in FIG. 17.

Turning now to FIGS. 16–18, another method of forming a blade 300 having an integral gas passage 302 will be described. Initially, a substantially planar blank is machined from mill or cast plate to provide an unformed blade 304 having an overall blade profile including control points 306, 307 similar to those described above and optional lifting tabs 308, 310. A shallow groove 312 is formed on a suction surface 314 of unformed blade 304 extending from a region along an inner edge 316 toward a distal out edge 318. A relatively thin cover plate 320 is fixedly secured to blade 300 to form gas passage 302 by welding a perimeter of cover plate 320 to an upper step 322 (see FIG. 18). Upper step 322 surrounds shallow groove 312 and is of sufficient depth such that a top surface 324 of cover plate 320 is about flush with suction surface 314 after securing cover plate 320 to step 322. A plurality of apertures 326 are formed in cover plate 320 extending from shallow groove 312 to suction surface 314 to allow for gas discharge. Alternatively, shallow groove 312 covered by cover plate 320 could be formed on the pressure side 315 of blade 304. In that case, apertures 326 would extend from passage 302 to suction side 314.

The side of blade 304 opposite that to which cover plate 320 is attached is then machined to establish a thickness distribution increasing from a trailing edge 328 forward to a line of maximum thickness 330, and then formed and finished in a manner similar to that described above with respect to blade 32. During the finishing operation, control points 306, 307 and lifting tabs 308, 310 are removed. Blade 300 is then ready for assembly to a crown 332 and a band 334 during formation of a runner 336.

Figure 18A:
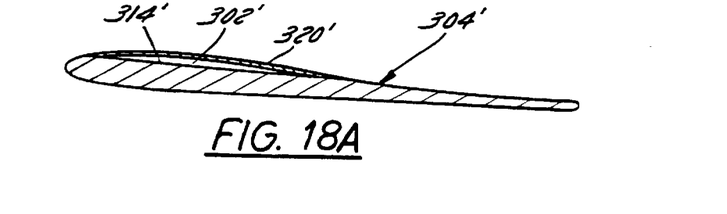
FIG. 18A is cross-sectional view of an alternative gas passage in a blade being shown in a partially manufactured condition.

FIG. 18A illustrates an alternative arrangement for forming a gas passage 302' on a partially formed blade 304'. Specifically, a perimeter of a relatively thin cover plate 320' is welded to a surface 314' of the blank so that cover plate 320' is concave relative to the blank, thus forming gas passage 302' therewith. With this arrangement, it is unnecessary to form the shallow groove beneath cover plate 320' to form the gas passage. In such case, blade 304' could be machined and pressed or could be cast. Cover plate 320' could be pressed also. In the event blade 304' and plate 320' are made of a material other than metal, different modes of attachment compatible with such material could also be used.

Figure 19:
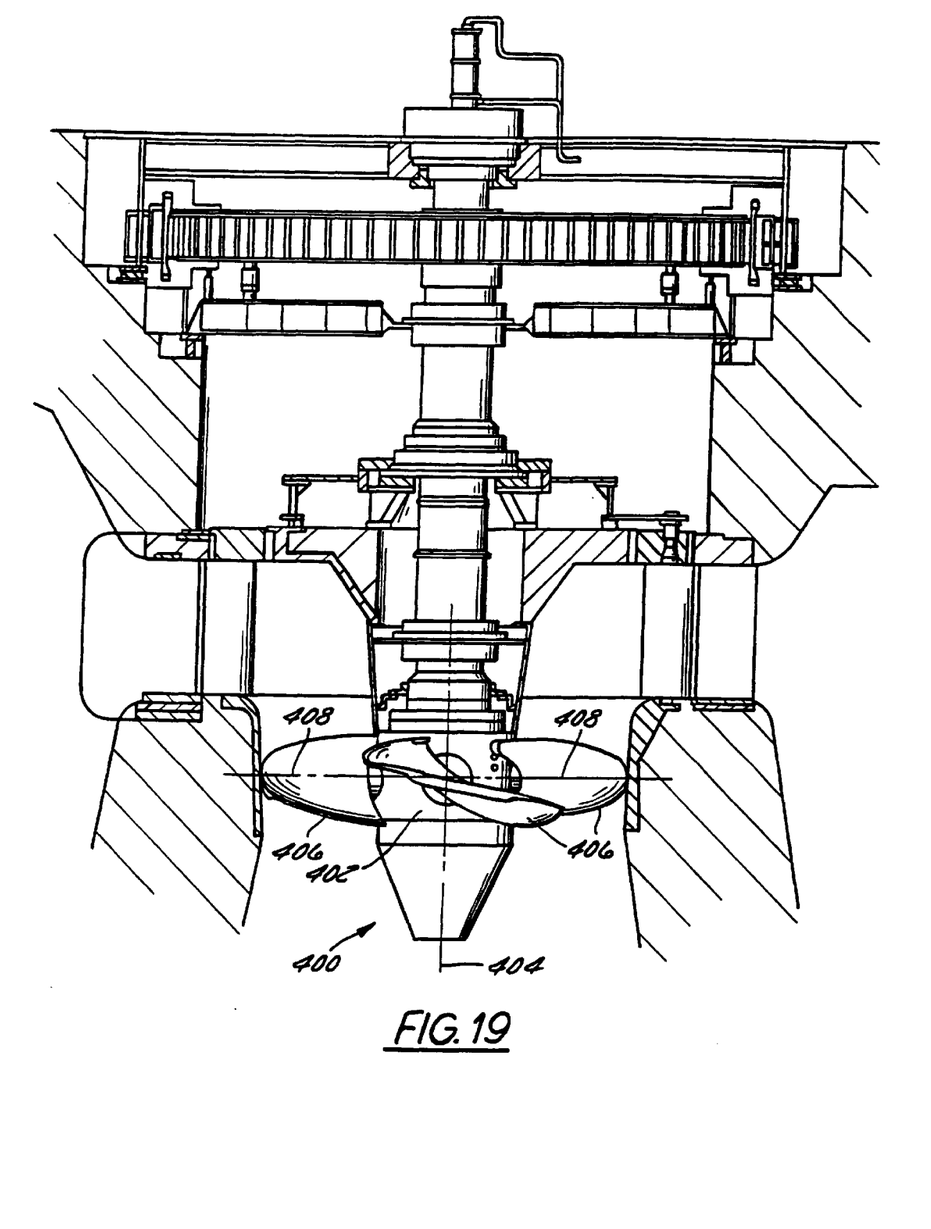
FIG. 19 is an elevational view, partially in cross section, of a Kaplan turbine in accordance with another embodiment of the present invention, showing a runner with adjustable blades.

Turning now to FIG. 19, a Kaplan turbine is shown generally as 400 comprising a hub 402 having a longitudinal axis 404 and a plurality of circumferentially spaced variable pitch blades 406 projecting generally radially outwardly from hub 402. Each blade 406 is pivotally connected to hub 402 about a rotational axis 408 extending in a direction generally perpendicular to longitudinal axis 404.

Figure 20:
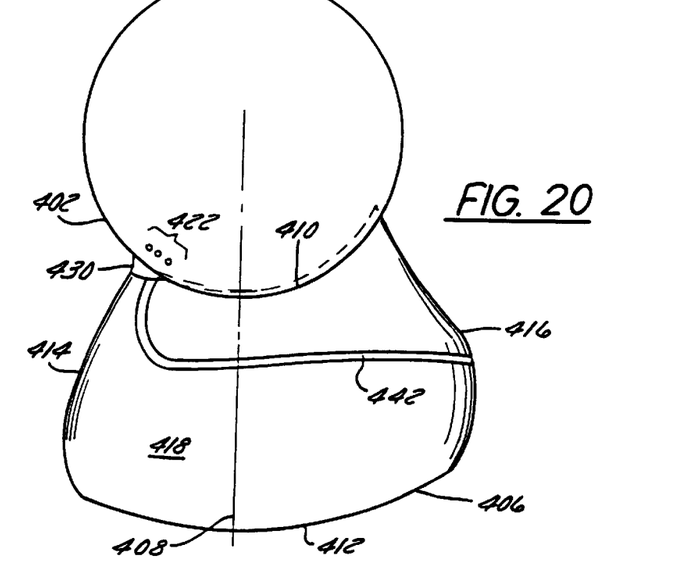
FIG. 20 is a top plan view of the hub and one associated blade of the runner of FIG. 19, showing a boot fitted onto a portion of the inner edge of the blade.
Figures 21, 22:
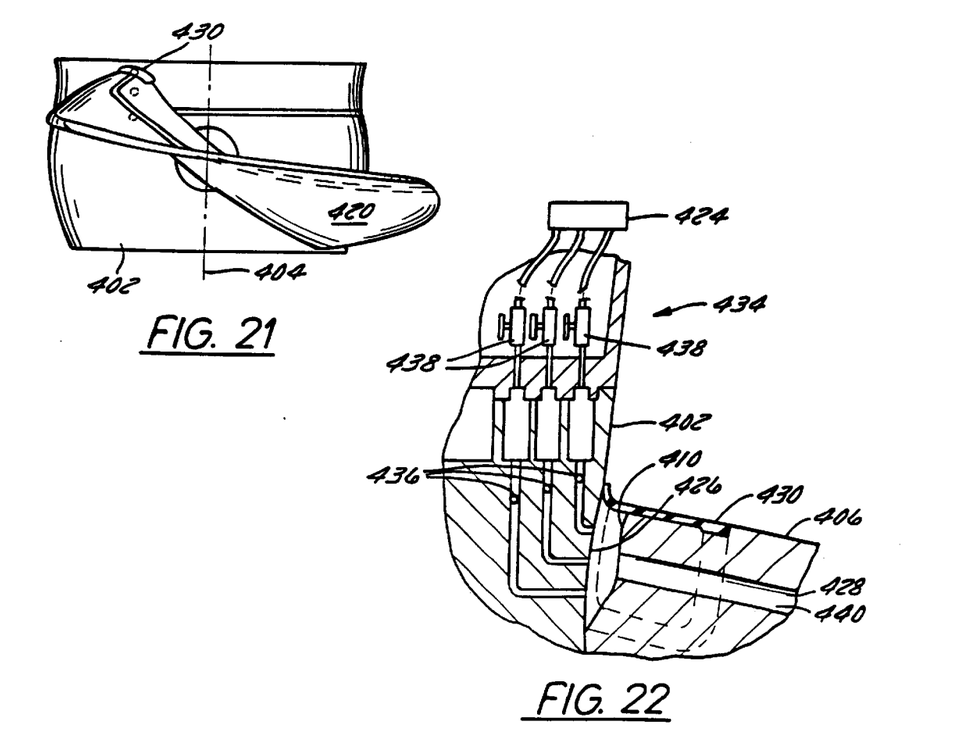
FIG. 21 is an elevational view of the hub, blade and boot shown in FIG. 20.
FIG. 22 is an enlarged partial sectional view showing the air passages, associated valves and governors used with the hub, blade and boot shown in FIG. 20.

Referring now more particularly to FIGS. 20–22, hub 402 will be further described with only one associated blade 406, but it will be understood the following description applies in similar manner to any number of the remaining blades. Blade 406 is bounded by an inner edge 410, a distal outer edge 412, a leading edge 414 and an opposed trailing edge 416 separated by a water directing surface 418 and an opposed suction surface 420. Blade 406 is rotatable from a maximum pitch position, in which water directing surface 418 extends in the general direction of axis 404, to a minimum pitch position, in which water directing surface 418 is substantially perpendicular to longitudinal axis 404. Hub 402 includes a group of gas passages 422 (see FIG. 20) extending from a gas source 424 (see FIG. 22) to an exterior surface region 426 of hub 402 associated with blade 406. Blade 406 has a gas admission passage 428 extending from inner edge 410 to trailing edge 416. Alternatively, gas admission passage 28 could extend to outer edge 412 of blade 406.

A flexible boot 430 is secured to blade 406 such that it is effectively in contact with exterior surface region 426. Boot 430 therefore seals off the cavity formed between inner edge 410 and surface region 426. Flexible boot 430 is made of a molded elastomeric material. In cases where the gap between hub 402 and inner edge 410 is merely a clearance gap (such as for example when hub 402 is fully spherical), boot 430 could simply be configured as a clearance seal.

As shown in FIG. 22, a control system shown generally as 434 selectively puts gas admission passage 428 into fluid communication with one or more selected gas passages of the group of gas passages 422 based on the pitch of blade 406. Control system 434 includes a separate check valve 436 for each gas passage and an associated actuator 438 which controls which valve(s) 436 admits gas into passage 428. Gas admission passage 428 in blade 406 comprises a channel 440 formed in water directing surface 418 and a cover plate 442 secured over channel 440. Gas passage 428 could be formed integrally as explained above.

Figure 23:
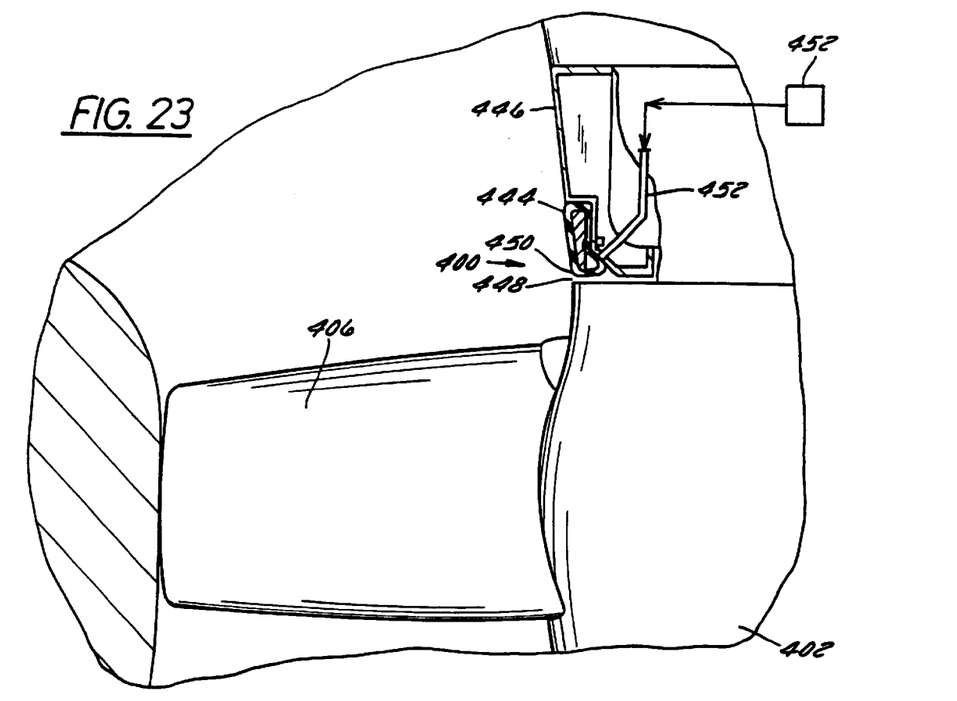
FIG. 23 is an elevational view, partially in cross section, of another embodiment of the present invention showing an inflatable shroud in deflated condition and a gas discharge opening adjacent the shroud.
Figure 24:
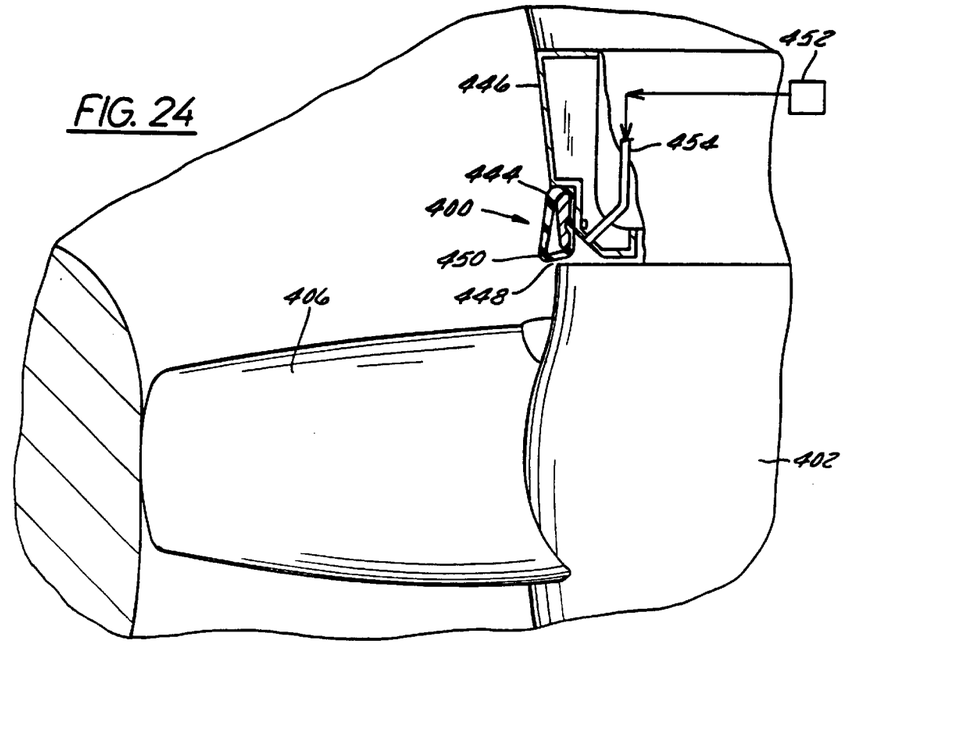
FIG. 24 is an elevational view, partially in cross section, of the embodiment of FIG. 23 showing the inflatable shroud in inflated condition and the gas discharge opening adjacent the shroud.

Turning now to FIGS. 23 and 24, a portion of turbine 400 of FIG. 19 is shown including hub 402 and blade 406. An inflatable shroud 444 is connected to a head cover 446 disposed upstream of hub 402, and a gas discharge opening 448 is positioned adjacent a downstream edge 450 of shroud 444. Shroud 444 may comprise a continuous inflatable belt surrounding the entire perimeter of head cover 446, or alternatively a plurality of shrouds 444 may be disposed and attached at discrete locations around the perimeter of head cover 446. Shroud(s) 444 is (are) inflated as required depending on the level of dissolved oxygen in the water passing through the turbine, thereby creating a low pressure region proximate opening 448 to facilitate the exhaust of gas therefrom. A compressor 452 may be used to force gas through a gas passage 454 leading to shroud(s) 444 and discharge opening 448 to increase dissolved oxygen level in the water.

Figure 25:
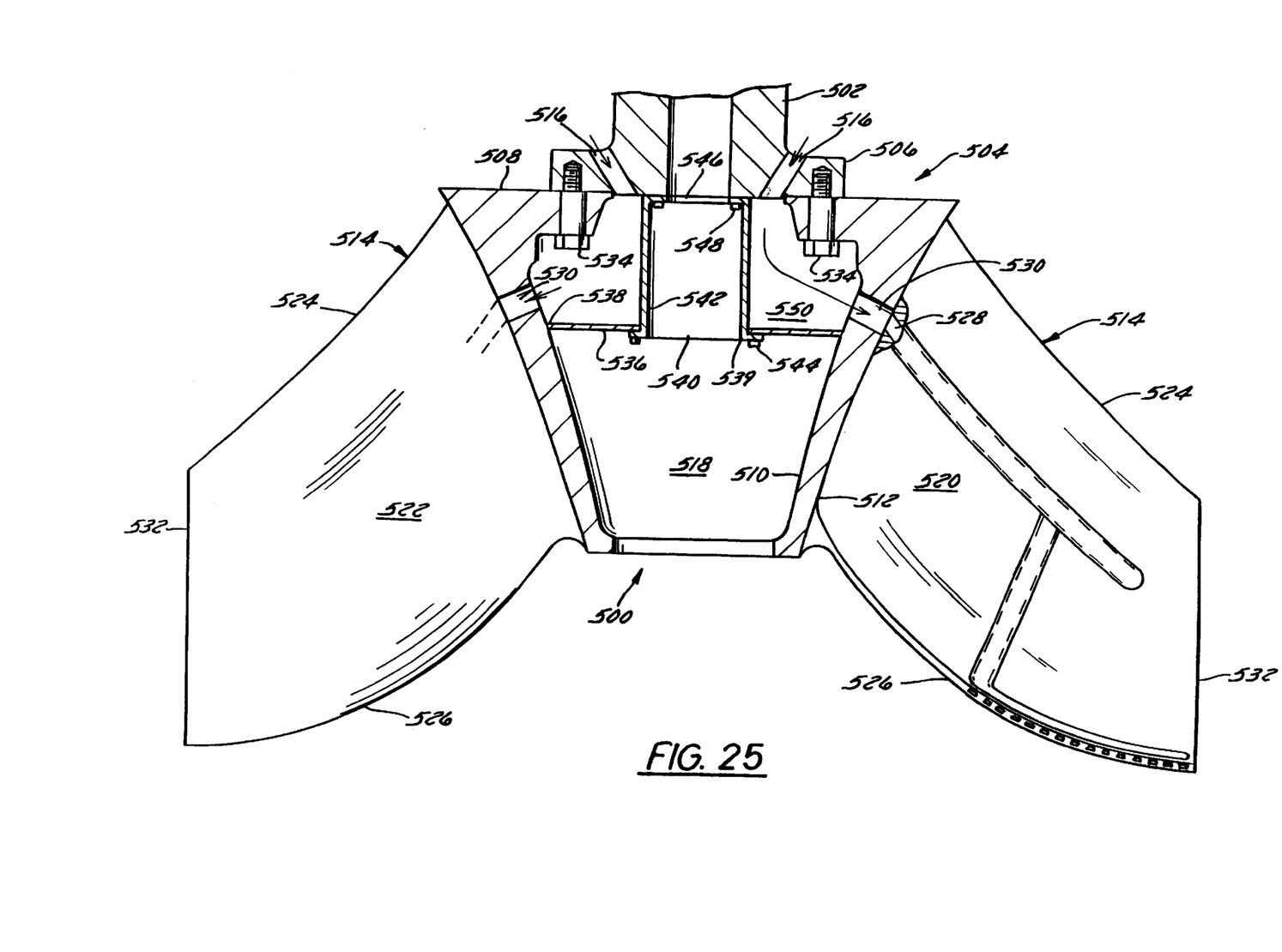
FIG. 25 is an elevational view, partially in cross section, of a bandless turbine including another embodiment of a runner of the present invention.

Referring to FIG. 25, a portion of a bandless turbine is shown generally as 500 having a shaft 502 and a runner 504 secured to a lower end 506 of shaft 502 for rotation therewith. Runner 504 includes a hollow hub 508 having spaced apart inner and outer surfaces 510 and 512, respectively, and a plurality of circumferentially spaced, generally radially extending blades 514. Shaft 502 has a plurality of openings 516 extending therethrough to an interior 518 of hollow hub 508.

Each blade 514 is defined by a pressure surface 520, an oppositely facing suction surface 522, a leading edge 524 and a spaced apart trailing edge 526. Each blade 514 further includes a passage 528 extending from a gas admission aperture 530 in inner surface 510 of hub 508 to trailing edge 526 of blade 514. Passage 528 in blade 514 extends along a portion of trailing edge 526 to an outer edge 532.

Runner 504 is releasibly secured to shaft 502 (e.g., by bolts 534) to position runner 504 in the water passageway. Interior 518 includes a horizontally disposed annular plate 536 having an outer edge 538 welded to inner surface 510 of hollow hub 508 at a region below gas admission aperture 530. A lower end 539 of a cylindrical member 540 is releasibly secured to an inner edge 542 of annular plate 536 (e.g., by bolts 544), and an upper end 546 of member 540 is releasibly secured to lower end 506 of shaft 502 (e.g., by bolts 548), thus forming an annular upper chamber 550. Chamber 550 thus fluidly couples openings 516 in shaft 502 to gas admission apertures 530 in hollow hub 508, which apertures 530 in turn are fluidly coupled with passages 528 in blades 514. An oxygen containing gas is supplied to openings 516 in shaft 502 during operation of turbine 500 to enhance dissolved oxygen level in water passing through turbine 500.

Figure 26:
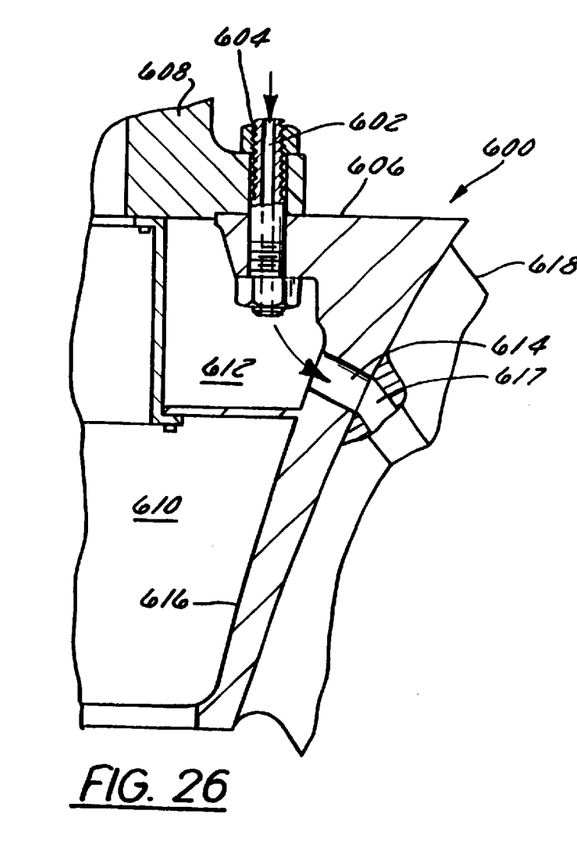
FIG. 26 is an elevation view, partially in cross section, of a bandless turbine including another embodiment of a runner of the present.

FIG. 26 shows an alternative arrangement for providing gas to a runner 600 of a bandless turbine. Specifically, gas is provided through an opening 602 in one or more hollow bolt(s) 604 used for coupling a hollow hub 606 of runner 600 to a shaft 608. Thus, an advantage of this is there is no need to form a separate opening in shaft 608. The structure of runner 600 is otherwise similar to that described above with respect to runner 504 of FIG. 25. That is, an interior 610 of hub 606 is provided with an upper chamber 612 for fluidly coupling opening 602 to a gas admission aperture 614 in an inner surface 616 of hub 606, which aperture 614 is in turn fluidly coupled with a passage 617 in a runner blade 618 leading to a trailing or outer edge thereof.

Figure 27:
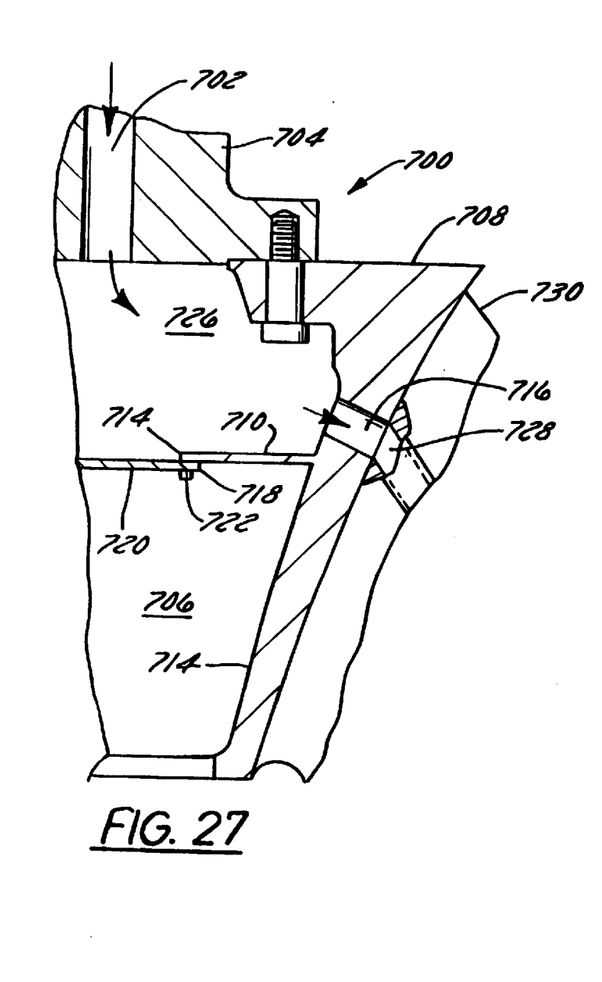
FIG. 27 is an elevation view, partially in cross section, of a bandless turbine including another embodiment of a runner of the present invention.

FIG. 27 shows another alternative arrangement for providing gas to a runner 700 in a bandless turbine. Specifically, gas is provided through a central opening 702 in a shaft 704 to an interior 706 of a hollow hub 708. Interior 706 includes a horizontally disposed annular plate 710 having an outer edge 712 welded to an inner surface 714 of hollow hub 708 at a region below a gas admission aperture 716 in inner surface 714. An outer edge 718 of a circular plate 720 is releasibly secured (e.g., by bolts 722) to an inner edge 724 of annular plate 710 to form an upper chamber 726 which fluidly couples opening 702 to gas admission aperture 716. Aperture 716 is in turn fluidly coupled with a passage 728 in a blade 730 leading to a trailing or outer edge thereof.

Figure 28:
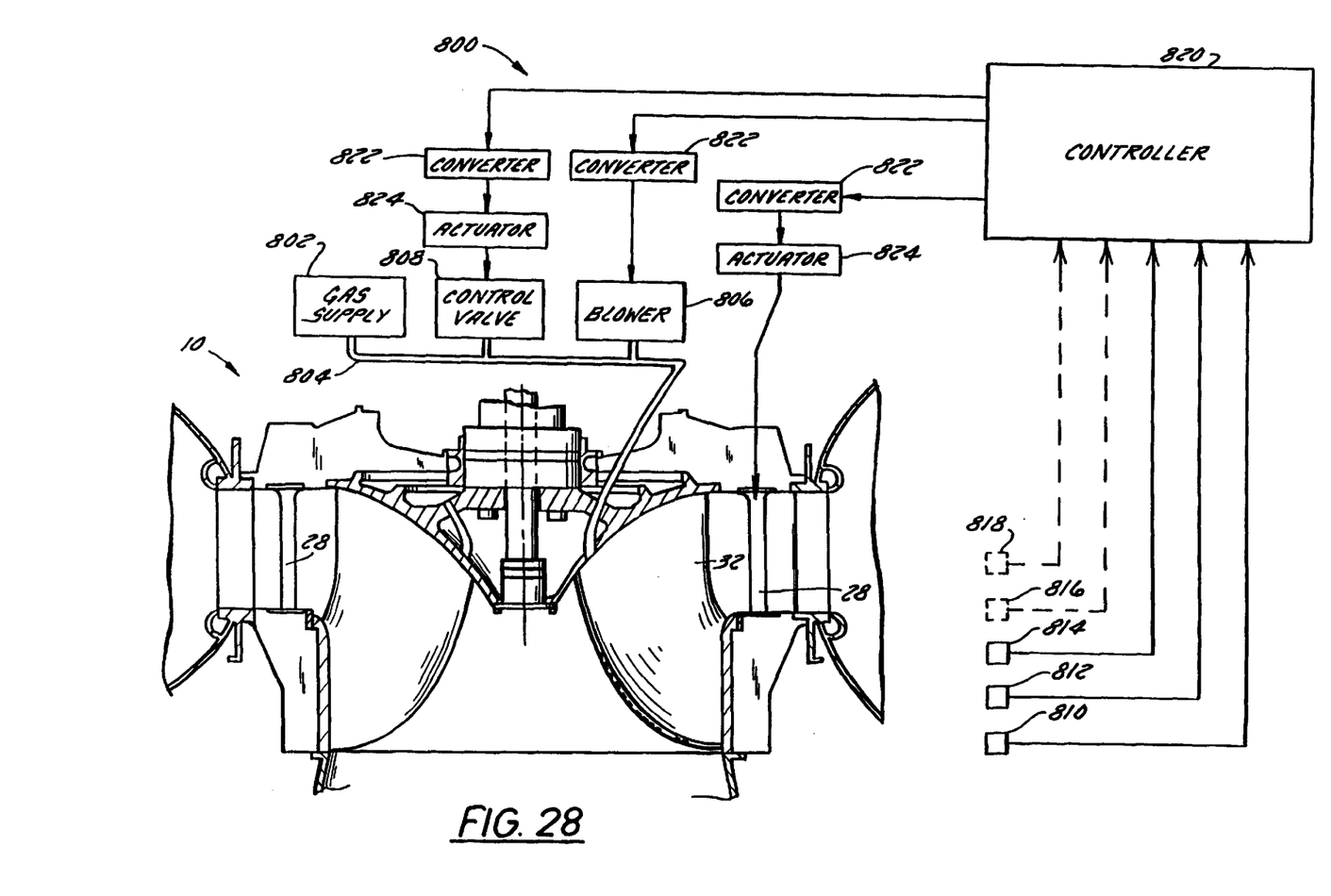
FIG. 28 shows a block diagram of a closed-loop control system associated with a turbine of the present invention.

Referring now to FIG. 28, a control system designated as 800 may advantageously be used with the various embodiments of the present invention. For purposes of illustration, however, control system 800 will be shown and described in combination with installation 10. Gas passages in blades 32 are connected to a gas supply 802 through a gas supply passageway 804. Preferably, a compressor or high volume blower 806 is provided to facilitate gas flow through gas supply passageway 804, and a control valve 808 is provided for limiting the gas flow therethrough.

Control system 800 includes a plurality of sensors 810–818 designed to measure turbine speed, power output, head water elevation, tail water elevation, head losses, water temperature, and dissolved oxygen level in the head and tail water, among others. The electric signals generated by sensors 810–818 are sent to a controller 820, preferably via signal conditioning circuits (not shown). Controller 820 also receives an electrical signal generated by sensor 812 which is representative of the position of wicket gate 28 and blade position in a Kaplan turbine. Controller 820 preferable includes a digital-based processor and required analog to digital conversion and signal scaling circuits.

The information provided by the various sensors is used in control algorithms allowing controller 820 to compute and generate various control signals, as required, for controlling the amount of oxygen containing gas flowing through passageway 804 to enhance the dissolved oxygen level of water passing through turbine 10, without significantly compromising the efficiency of operation. To that end, the control signals generated by controller 820 are fed to a plurality of signal converters generally designated as 822. The signal from each signal converter 822 is sent in the appropriate form to an associated actuator 824 driving control valve 808, or to blower 806.

Although a variety of embodiments have been particularly described, it should be understood that the above description is of preferred exemplary embodiments of the present invention, and that the invention is not limited to the specific forms described. For example, gas supply passageway configurations and locations need not be of the kind described herein. In addition, controllers of the type associated with the described gas supply means do not need to the of the digital processor-based type. Such other constructions are, nevertheless, considered to be within the scope of this invention. Accordingly, these and other substitutions, modifications, changes and omissions may be made in the design and arrangement of the elements and in their method of operation as disclosed herein without departing from the scope of the appended claims.

What is claimed is:

1. A hydraulic turbine installation, comprising:
   a water passageway for containing turbine components and extending from an upper elevation source of water to a lower elevation discharge region;

a turbine shaft including at least one passage extending therethrough;

a turbine runner secured to a lower end of the shaft and disposed in the water passageway so that water flowing therethrough impinges on the runner, the runner including a hollow hub having spaced apart inner and outer surfaces, and a plurality of blades extending generally radially outwardly at spaced intervals along the outer surface of the hub, each blade being defined by a pressure surface, an oppositely facing suction surface, a leading edge and a spaced apart trailing edge, the at least one passage in the shaft opening into an upper interior region of the hollow hub, wherein the runner includes at least one gas passage extending therethrough, the gas passage extending from a gas admission aperture formed in the inner surface of the hub and through a respective one of the plurality of blades to a gas discharge aperture formed in an edge region of the respective blade, and wherein a fluid barrier is provided between the upper interior region of the hub and a lower interior region of the hub to define an upper chamber within the hollow hub that fluidly couples the at least one opening in the shaft with the at least one passage in the runner; and means for supplying an oxygen containing gas to the at least one passage in the shaft.

2. The turbine installation of claim 1, wherein the means for supplying the gas includes a high volume blower or compressor.

3. The turbine installation of claim 1, wherein the fluid barrier includes a generally flat plate having an outer circumferential edge secured to the inner surface of the hub in a fluid sealing relationship.

4. The turbine installation of claim 3, wherein the outer circumferential edge of the flat plate is welded to the inner surface of the hub.

5. The turbine installation of claim 3, wherein the fluid barrier further includes a generally cylindrical member having a lower end secured to the flat plate and an upper end secured to the lower end of the shaft.

6. The turbine installation of claim 5, wherein the cylindrical member is releasibly secured to the flat plate and the lower end of the shaft by bolts.

7. The turbine installation of claim 3, wherein the flat plate has a central opening and the fluid barrier further includes a circular plate having an outer circumferential edge secured to an inner circumferential edge of the flat plate in a sealing relationship to close the central opening.

8. The turbine installation of claim 3, wherein the outer circumferential edge of the circular plate is bolted to the inner circumferential edge of the flat plate.

9. The turbine installation of claim 3, wherein the flat plate is disposed generally horizontally within the interior of the hub.

10. The turbine installation of claim 1, wherein the at least one passage formed in the shaft is configured to receive a hollow bolt for securing the runner to the shaft, the hollow bolt having a gas passage extending therethrough.

11. The turbine installation of claim 1, wherein the at least one passage formed in the shaft is configured as a central passage extending lengthwise within the shaft along the axis of rotation of the shaft.

12. The turbine installation of claim 1, wherein the lower interior region of the hollow hub is open to the water passageway.

13. A method of increasing the dissolved oxygen level in water flowing from an upper elevation source to a lower elevation discharge region through a water passageway of a reaction turbine including a shaft and a runner secured to a lower end of the shaft, the runner including a hollow hub having spaced apart inner and outer surfaces and a plurality of blades extending generally radially outwardly at spaced intervals along the outer surface of the hub, each blade being defined by a pressure surface, an oppositely facing suction surface, a leading edge and a spaced apart trailing edge, the shaft including at least one passage extending therethrough and opening into an upper interior region of the hollow hub, the method comprising the steps of:

forming at least one gas passage through the runner, the passage extending from a gas admission aperture formed in the inner surface of the hub and through a respective one of the plurality of blades to a gas discharge aperture formed in an edge region of the respective blade;

forming a fluid barrier between the upper interior region of the hub and a lower interior region of the hub to define an upper chamber within the hollow hub that fluidly couples the at least one opening in the shaft with the at least one passage in the runner;

operating the turbine with the runner in the water passageway so that water impinges upon the blades as water passes through the passageway from the source to the discharge region; and selectively supplying an oxygen containing gas to the at least one opening in the shaft during operation of the turbine.

14. The method of claim 13, wherein supplying the gas includes assisting the flow of gas through the at least one opening in the shaft with a high volume blower or compressor.

15. The method of claim 13, wherein forming the fluid barrier to define the upper chamber includes securing an outer circumferential edge of a generally flat plate to the inner surface of the hub in a sealing relationship at a location below the gas admission aperture formed in the inner surface.

16. The method of claim 15, wherein forming the outer circumferential edge of the flat plate is secured to the inner surface of the hub by welding.

17. The method of claim 15, wherein forming the fluid barrier to define the upper chamber within the hollow hub further includes:

securing a lower end of a generally cylindrical member to an inner circumferential edge of the flat plate; and securing an upper end of the cylindrical member to the lower end of the shaft so that the at least one passage in the shaft opens into the upper chamber.

18. The method of claim 15, wherein forming the fluid barrier to define the upper chamber within the hollow hub further includes securing an outer circumferential edge of a circular plate to an inner circumferential edge of the flat plate in a sealing relationship.

19. The method of claim 15, wherein the at least one passage in the shaft is configured to receive a hollow bolt for securing the runner to the shaft, the supplying the gas step including channeling gas to a gas passage formed in the hollow bolt.

20. The method of claim 13, wherein the at least one passage in the shaft is configured as a central passage extending lengthwise through the shaft along the axis of rotation, the supplying the gas step including channeling gas through a central passage.

* * * * *